July 5, 1938.   G. F. HOFFMANN   2,122,470
VISCOSIMETER
Filed July 30, 1936   2 Sheets-Sheet 1

INVENTOR.
GILBERT F. HOFFMANN
BY Bradley & Bee
ATTORNEYS.

July 5, 1938.  G. F. HOFFMANN  2,122,470
VISCOSIMETER
Filed July 30, 1936  2 Sheets-Sheet 2

INVENTOR.
GILBERT F. HOFFMANN
BY Bradley & Bee
ATTORNEYS.

Patented July 5, 1938

2,122,470

UNITED STATES PATENT OFFICE 2,122,470

VISCOSIMETER

Gilbert F. Hoffmann, Wauwatosa, Wis., assignor to Pittsburgh Plate Glass Company, Allegheny County, Pa., a corporation of Pennsylvania Application July 30, 1936, Serial No. 93,448

2 Claims. (Cl. 265—11)

This invention relates to a new instrument which is of particular value in determining certain physical properties, namely, the viscosity and yield-point, of liquids, pastes, and pseudo plastics.

The primary object of the present invention is to provide means for measuring accurately and quickly the viscosity and plasticity of oils, pastes, paints, varnishes, and similar compositions. A second object of the invention is to provide a simple apparatus for determining these physical characteristics applicable to the necessary control work in manufacturing plants which may be operated by workmen not possessed of technical training. A further object of my invention is to provide apparatus for measuring viscosity at a constant rate of shear and for determining plasticity under similar conditions.

Heretofore control men and workers in the paint industry have been required to employ numerous instruments in order to determine the quality and physical characteristics of the materials being produced. This naturally entailed considerable loss in time and made it very difficult to secure information on different properties under comparable conditions. Furthermore, the devices with which they worked were not applicable to all materials covering a wide range of liquid viscosities.

Figure 1:
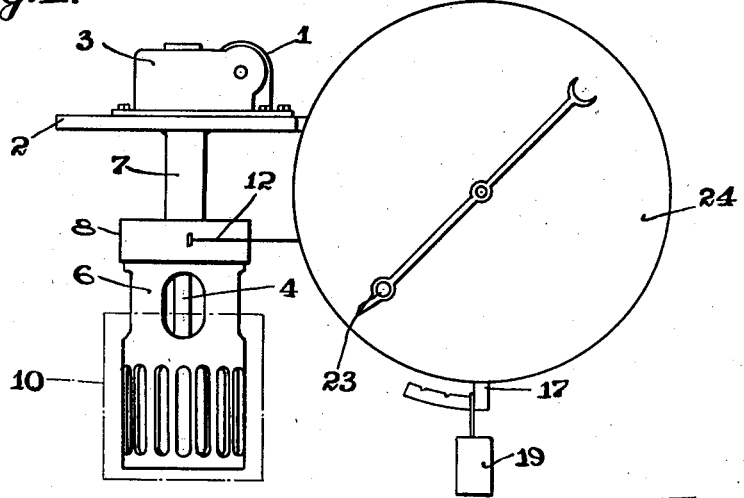
Figure 3:
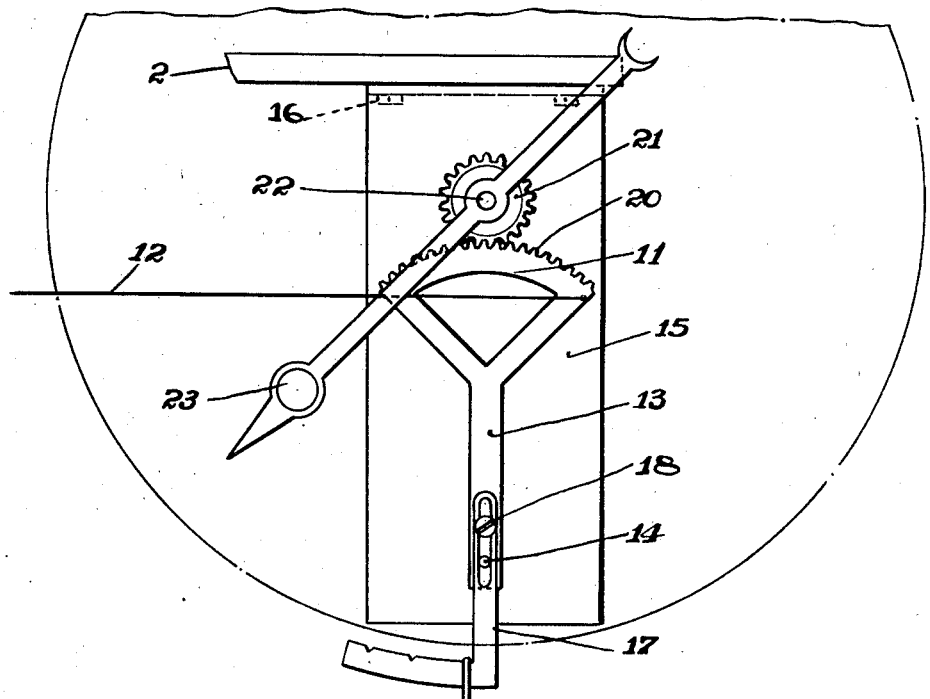
Figure 2:
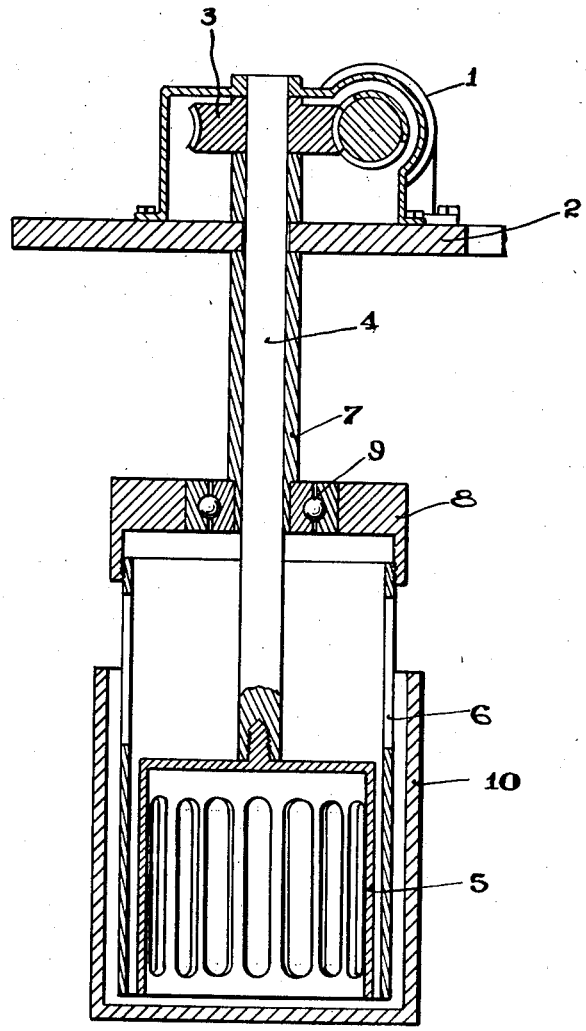

The accompanying drawings illustrate a practical embodiment of my invention, wherein:

Figure 1 is a side elevation of a viscosimeter and gauge constructed in accordance with the present invention; Figure 2 is a sectional view of the viscosimeter; and Figure 3 is a front elevation on a larger scale of the indicating means.

Referring to the drawings, the apparatus consists of a constant speed motor 1, secured to a base 2, operating through a reducing worm gear 3 connected to a drive shaft 4 attached to a slotted agitating cylinder 5. A second slotted cylinder 6 is suspended from a sleeve 7 by means of a cup 8 embodying a bearing 9 to enclose the motor driven cylinder 5. The bearing 9 is placed between the sleeve 7 and the cup 8 to insure free movement of said cylinder 6. The cylinders are encased in a container 10 which may be of any convenient size. Suitable means are provided (not shown) for regulating the temperatures of material placed in the container 10 to be tested. The cylinder 6 is tangentially connected to a segmental gear 11, as indicated at 12, having an integral shank 13 pivotally mounted at 14 upon a plate 15, which plate is secured to the motor base 2 in any convenient manner, as by bolts 16. A slotted extension 17 of L-shape is adjustably secured to the shank 13 by means of a bolt 18, and a weight 19 is positioned upon the lateral arm of the extension 17. Teeth 20 upon the segmental gear 11 engage a gear 21 keyed to a shaft 22, rotatably mounted upon the plate 15, which shaft also carries a pointer 23. The ratio existing between the teeth 20 on the segmental gear 11 and the gear 21 is such that one complete revolution of the pointer 23 is obtained by moving the segmental gear 11 through an arc of 45 degrees. A dial 24, over which the pointer 23 moves, is supported by the plate 15, and may be calibrated in any desired units. This indicating gauge is shown combined with the viscosimeter to form a single unit but it may be set up independently of the remainder of the apparatus if such arrangement is desired.

In the operation of the apparatus to make a viscosity measurement, the agitating unit 5 and the cylinder 6 are immersed in a liquid or paste, held in the container 10, to a definite depth. The motor 1 is then started to drive the agitator 5, which action results in a circular movement of the material being tested. The cylinder 6 is caused to rotate in the same direction as the agitating cylinder 5 solely by the rotative action of the moving liquid or paste since the construction of the apparatus is such that no mechanical torque is transmitted from the rotating shaft 4 to said cylinder 6. The rotation of the cylinder 6 is stopped when the hydrodynamic torque is equalized by the restraining force of the weighted indicating means exerted thereon through the connection 12. The total movement of the cylinder 6 is indicated by the pointer 23 upon the dial 24. In the event the viscosity of the material being measured is very high, additional weights may be added to the lateral arm of the extension 17 to return the pointer 23 within its range of readings upon the dial 24. Manifestly, both the weights and the dial must be calibrated with liquids and pastes of known viscosities before the instrument is ready for actual use.

In making yield-point determinations at zero rate of shear, the procedure is as follows:

The apparatus is assembled as for a viscosity measurement but the agitating unit 5 is not used. The cylinder 6 is slowly turned by hand in a clockwise direction to a point at which, when released, it will not remain, due to the tangentially applied weight of the indicating means exerted through the connection 12. The cylinder 6 is then allowed to return slowly in the opposite direction to a point where, without vibration or jar, it will remain constant. This point can be read in the same units as the viscosity measurement and represents the yield-point at zero rate of shear. This measurement is of great value in determining and studying the consistency of paints. It is to be noted that materials which possess the physical characteristics of liquids or pseudo plastics do not produce a yield-point reading on the instrument.

This invention combines the principles of both the torsion viscosimeter and the pendulum torsion balance to produce an instrument which measures two distinct physical properties of liquids and plastics. Heretofore the plasticity of a material has been measured either by indirect methods on viscosimeters or on entirely separate instruments. It is obvious, therefore, that my invention obviates the necessity of utilizing separate instruments for measuring both viscosity and plasticity of a material. Furthermore the present invention permits such measurements to be made under identical conditions. Manifestly these advantages will greatly enhance the value of the improved viscosimeter.

What I claim is:

1. In combination in apparatus for determining a plurality of physical constants of a fluid composition, a hollow slotted cylinder attached to and driven through a vertical shaft, a second hollow slotted cylinder mounted around and independent of said first mentioned cylinder for free rotation and means actuated by the second cylinder to indicate the magnitude of movement imparted thereto.

2. In combination in apparatus for determining the viscosity and plasticity of fluid compositions, a hollow slotted cylinder attached to and driven at a constant speed through a vertical shaft, a second hollow slotted cylinder of greater size than the first, mounted independently of and capable of free rotation with respect to said first mentioned cylinder, said cylinders being positioned in definitely fixed relation, and means connected to and actuated by the outer cylinder to register the magnitude of torque imparted to said outer cylinder.

GILBERT F. HOFFMANN.